United States Patent
Schwartz et al.

(10) Patent No.: US 12,395,017 B2
(45) Date of Patent: Aug. 19, 2025

(54) WIRELESS POWER SYSTEMS WITH SHARED INDUCTIVE-LOSS SCALING FACTORS

(71) Applicant: Apple Inc., Cupertino, CA (US)

(72) Inventors: Adam L Schwartz, Redwood City, CA (US); Weihong Qiu, San Ramon, CA (US); Ruiyang Lin, Milpitas, CA (US); Shubha Ramakrishnan, San Jose, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 679 days.

(21) Appl. No.: 17/681,363

(22) Filed: Feb. 25, 2022

(65) Prior Publication Data

US 2022/0320911 A1    Oct. 6, 2022

Related U.S. Application Data (60) Provisional application No. 63/167,971, filed on Mar. 30, 2021.

(51) Int. Cl.
*H02J 50/80* (2016.01)
*H02J 50/12* (2016.01)
*H02J 50/60* (2016.01)

(52) U.S. Cl.
CPC .............. *H02J 50/60* (2016.02); *H02J 50/12* (2016.02); *H02J 50/80* (2016.02)

(58) Field of Classification Search
CPC .............. H02J 50/12; H02J 50/60; H02J 50/80

(Continued)

(56) References Cited

U.S. PATENT DOCUMENTS

| 8,620,484 B2 | 12/2013 | Baarman et al. |
| 9,294,153 B2 | 3/2016 | Muratov et al. |

(Continued)

FOREIGN PATENT DOCUMENTS

| JP | 2013541313 T | 11/2013 |
| JP | 2016531538 A | 10/2016 |
| JP | 2019515629 A | 6/2019 |

OTHER PUBLICATIONS

Office Action for Japanese Patent Application No. 2023-557055 dated Aug. 29, 2024; 2 pgs.

(Continued)

*Primary Examiner* — Nathaniel R Pelton
(74) *Attorney, Agent, or Firm* — FLETCHER YODER PC (57) ABSTRACT

A wireless power system has a wireless power transmitting device with a wireless power transmitting coil and an inverter. The inverter and wireless power transmitting coil are used to transmit wireless power signals. The wireless power system also has a wireless power receiving device configured to receive the wireless power signals using a wireless power receiving coil. A rectifier in the wireless power receiving device rectifies alternating-current signals from the wireless power receiving coil and produces corresponding direct-current power. Power loss calculations may be used to help determine whether a foreign object might be present in the vicinity of a coupled wireless power transmitter and receiver. In an ecosystem with multiple models of transmitter and multiple models of receiver, model-dependent scaling factors may be maintained and exchanged between a given coupled transmitter and receiver pair to allow accurate power loss estimates to be made.

16 Claims, 4 Drawing Sheets

(58) Field of Classification Search
USPC .......................................................... 320/108
See application file for complete search history.

(56) References Cited

U.S. PATENT DOCUMENTS

| | | | |
|---|---|---|---|
| 10,103,584 B2 | 10/2018 | Van Wageningen et al. | |
| 2012/0077537 A1* | 3/2012 | Muratov | H02J 50/12 |
| | | | 455/522 |
| 2016/0149440 A1 | 5/2016 | Staring | |
| 2017/0063165 A1 | 3/2017 | Baarman et al. | |
| 2018/0309327 A1* | 10/2018 | Miyamoto | H02J 50/70 |
| 2019/0222066 A1* | 7/2019 | Kozakai | H02J 50/60 |
| 2020/0083754 A1 | 3/2020 | Tian et al. | |
| 2020/0169123 A1 | 5/2020 | Mehas et al. | |
| 2020/0328616 A1 | 10/2020 | Van Wageningen et al. | |
| 2021/0066973 A1 | 3/2021 | Park et al. | |
| 2023/0107009 A1* | 4/2023 | van Wageningen | H02J 50/12 |
| | | | 307/104 |
| 2023/0122918 A1* | 4/2023 | Shimura | H02J 50/12 |
| | | | 307/104 |

OTHER PUBLICATIONS

Decision to Grant for Japanese Patent Application No. 2023-557055 dated Nov. 28, 2024; 1 pgs.

\* cited by examiner

WIRELESS POWER SYSTEMS WITH SHARED INDUCTIVE-LOSS SCALING FACTORS

This application claims the benefit of provisional patent application No. 63/167,971, filed Mar. 30, 2021, which is hereby incorporated by reference herein in its entirety.

FIELD

This relates generally to power systems, and, more particularly, to wireless power systems for charging electronic devices.

BACKGROUND

In a wireless charging system, a wireless power transmitting device wirelessly transmits power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

Wireless power transmitting devices may transmit wireless power to wireless power receiving devices. In each wireless power transmitting device, an inverter and wireless power transmitting coil are used to transmit wireless power signals. Wireless power receiving devices may be magnetically coupled to wireless power transmitting devices so that power may be transferred from the transmitting devices to the receiving devices. In each wireless power receiving device, wireless power signals from a paired transmitting device are received using a wireless power receiving coil. A rectifier in the wireless power receiving device rectifies alternating-current signals from the wireless power receiving coil and produces corresponding direct-current power.

Power loss calculations may be used to help determine whether a foreign object might be present in the vicinity of a coupled wireless power transmitter and receiver. If an estimated foreign object power loss value is determined to be below a predetermined threshold, wireless power transfer operations may proceed normally. If, however, an estimated foreign object power loss value is determined to be above the predetermined threshold, it can be concluded that a foreign object is present and normal power transfer operations may be halted or otherwise forgone.

In an ecosystem with multiple models of transmitter and multiple models of receiver, scaling factors may be maintained by the transmitters and receivers. These scaling factors may be exchanged between the transmitter and receiver in a coupled transmitter-receiver pair to allow accurate power loss estimates to be made.

Ecosystem scaling techniques can also be used more generally, for example, to adjust runtime models of other types in a coupled system such as a system with multiple types of transmitters and receivers. This can be useful for any algorithm which depends on these models to calculate properties in a mated system. As examples, ecosystem scaling can be used in wireless power transfer systems in estimating the coupling between a transmitter and receiver or in estimating the maximum power delivery or coil-to-coil efficiency of power delivery. In general, any ecosystem with different possible permutations of mated devices may exchange scaling factors and/or other parameters at runtime to enable an accurate coupled model for the mated devices.

DETAILED DESCRIPTION

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a wrist watch, cellular telephone, tablet computer, laptop computer, removable battery case, electronic device accessory, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

If a foreign object such as a paperclip, coin, or other metallic object is present near the wireless power transmitting coil of the wireless power transmitting device, there may be eddy current generation in the foreign object that could increase its temperature. To determine whether a foreign object is present in the vicinity of the wireless power transmitting device, power loss estimates are made. For example, the amount of power loss in the transmitter and the amount of power loss in the receiver are estimated. By comparing the measured output power from the rectifier circuitry to the amount of input power to the inverter and by subtracting estimated transmitter and receiver losses, the amount of power that might have been absorbed by a foreign object can be computed. If the estimated foreign object power is higher than a threshold, power delivery can be halted and/or other suitable action taken.

To estimate foreign object power loss values accurately, various potential sources of power loss in a wireless power system should be taken into account. Some power losses exhibited by power transmitters and receivers are independent of the magnetic properties of the transmitters and receivers (e.g., switching losses, losses that depend on the drain-source resistance of field-effect transistors in the inverters and rectifiers, etc.). Losses such as these can be taken into account by characterizing relevant device components (e.g., by ascertaining transistor drain-source resistances using measurements made during manufacturing tests and/or other tests).

Transmitters and receivers also exhibit power losses that depend on the inductive properties of the transmitters and receivers (e.g., losses dependent on the magnetic properties of coupled transmitters and receivers, sometimes referred to as mating-dependent losses, inductive losses, magnetic losses, etc.). Examples of power losses that are dependent on the magnetic properties of the transmitters and receivers include: 1) coil losses that depend on the alternating-current (AC) resistances of mated transmitting and receiving coils, 2) friendly metal losses (e.g., power losses due to eddy currents induced in the metal housing of a receiving device, and 3) foreign object losses that arise in the event that a foreign object is present between a transmitter and receiver. Power losses such as these that are dependent on the magnetic properties of the transmitter and receiver may sometimes be characterized in terms of LQK magnetic parameters, where L refers to the inductance of the transmitting and receiving coils, Q refers to the quality factor of the coils, and K refers to the magnetic coupling of the coils.

In a wireless power ecosystem with numerous different transmitters and receivers, each pairing between a given one of the transmitters and a given one of the receives will result in potentially different set of magnetic properties, thereby posing challenges to accurate assessment of power losses that depend on the magnetic properties of a coupled transmitter-receiver pair. To facilitate accurate transmitter and receiver power loss estimates, the magnetic power loss parameters associated with transmitters and receivers can be determined using measurements between various models of transmitter and receiver and reference units (e.g., reference transmitters and reference receivers). Characterizing information from measurements made with reference transmitters and/or reference receivers can be stored in each different model of device and subsequently used to help ensure accurate power loss estimates are made when a particular model of transmitter is paired with a particular model of receiver.

Figure 1:
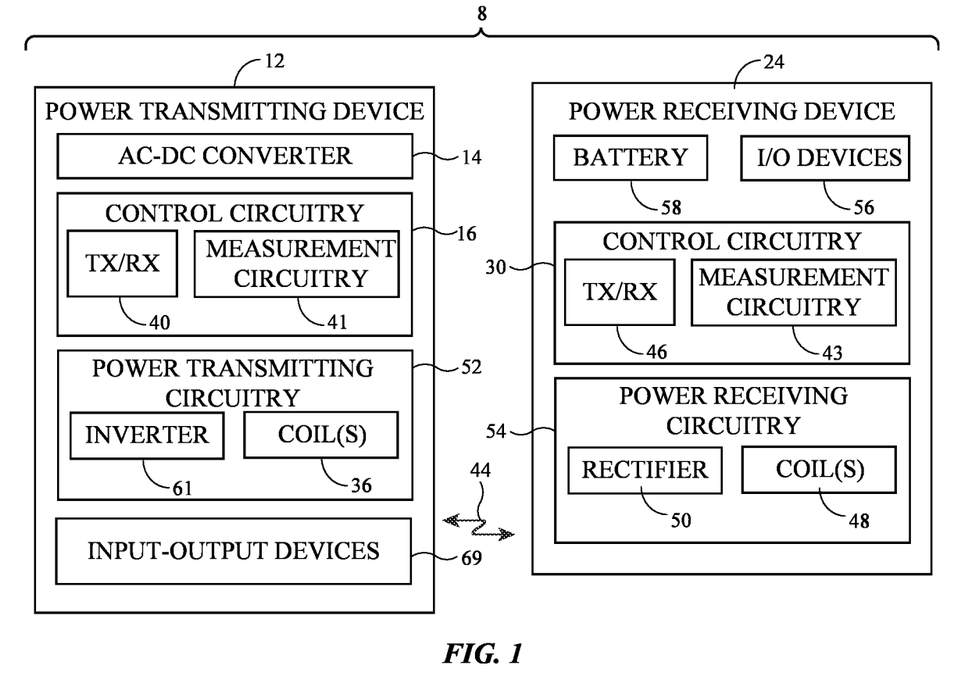
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a wrist watch, a cellular telephone, a laptop computer, a tablet computer, an accessory such as an earbud, a wirelessly charged removable battery case for an electronic device, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output.

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring on or more currents such as a wireless power transmitting coil current).

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring on or more currents such as wireless power receiving coil current and/or rectifier output current).

Figure 2:
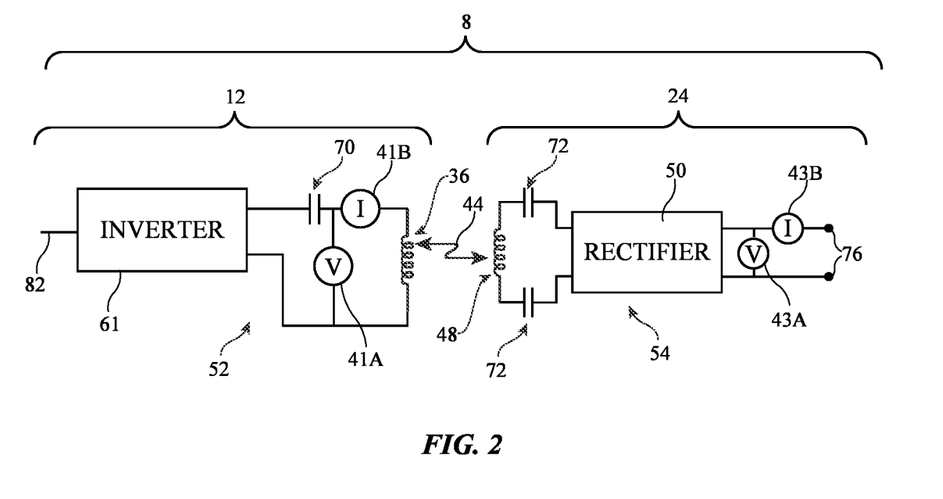
FIG. 2 is a circuit diagram of an illustrative wireless power system in accordance with an embodiment.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example). In other implementations, voltage across capacitor 70 is measured and current through the coil is inferred from that measurement.

As shown in FIG. 2, wireless power transmitting circuitry 52 includes inverter circuitry 61. Inverter circuitry (inverter) 61 may be used to provide signals to coil 36. During wireless power transmission, the control circuitry of device 12 supplies signals to control input 82 of inverter 61 that cause inverter 61 to supply alternating-current drive signals to coil 36. Circuit components such as capacitor 70 may be coupled in series with coil 36 as shown in FIG. 2. Measurement circuitry 41 in device 12 may make measurements on operating currents and voltages in device 12. For example, voltage sensor 41A may be used to measure the coil voltage across coil 36 and current sensor 41B may be used to measure the coil current through coil 36.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load. Measurement circuitry 43 in device 24 may make measurements on operating currents and voltages in device 24. For example, voltage sensor 43A may measure Vrect (the output voltage of rectifier 50) or a voltage sensor may measure the coil voltage on coil 48. Current sensor 43B may measure the rectifier output current of rectifier 50 or a current sensor may measure the current of coil 48.

The measurements made by measurement circuitry 41 and 43 may be processed to extract magnetic loss properties (e.g., coefficients or other parameters that characterize the amount of power losses in devices 12 and 24 and that are dependent on the magnetic properties of the transmitter and receiver). These measurements may be stored within each device and may be exchanged between devices so that device 12 (and, if desired, device 24) may use this information in accurately estimating any foreign object power loss that might be present.

If desired, these measurements may be used to estimate how well transmitter and receiver are able to transfer wireless power and therefore whether a user is to be informed that wireless power transfer operations are proceeding normally. For example, these measurements may be used to estimate a magnetic coupling coefficient K, wireless power transfer efficiency, estimated foreign object power loss, and/or other attributes of the mated transmitter-receiver pair. In addition to or instead of estimating foreign object power loss to determine whether a foreign object is present and therefore whether to proceed with wireless power transfer, the system 10 may use this information (e.g., estimated foreign object power loss and/or related coupling and/or efficiency information) to determine whether to present the user of system 10 with a confirmatory message to inform a user that wireless power transmission are proceeding properly (e.g., to inform the user that this process has not been thwarted by the presence of poor coupling due to presence of a foreign object, possible misalignment, or other factors). Exemplary confirmatory messages include audio output such as a chime and/or visual output presented on device 24. A chime may involve presentation of an audible chime tone and a visual user interface affordance (e.g., a battery charging icon or other visual alert displayed on a display in device 24 or other display). By providing the chime, the user is reassured that charging operations are proceeding normally (e.g., so that the user is comfortable walking away from system 8 and leaving devices 12 and 24 unattended until charging is complete).

In general, any suitable information may be exchanged between devices in system 8 and this information may be used in any suitable way. The exchange of measurements such as those made using measurement circuitry 41 and 43 and the use of this information in determining whether a foreign object is present is illustrative.

Following measurements with circuitry 41 and 43, the amount of power potentially absorbed by a foreign object in system 10 may be determined using equation 1.

$$PFO = POUT - PIN - PLOSSTX - PLOSSRX \tag{1}$$

In equation 1, PFO represents the amount of power absorbed by a foreign object that is present (if any). POUT represents output power (e.g., the output power of rectifier 50), PIN represents input power (e.g., the input power to coil 36), PLOSSTX represents power loss attributable to device 12, and PLOSSRX represents power loss attributable to device 24. The values of POUT and PIN may be measured (e.g., using circuitry 41 and 43). Mathematical models may be used to produce functional expressions for PLOSSTX and PLOSSRX and these expressions can be evaluated using measured operating parameter such as the measurements made using circuitry 41 and 43. For example, with one illustrative modeling embodiment, PLOSSTX and PLOSSRX can be computed using equations 2a and 3a, respectively.

$$PLOSSTX = b*RAIRTX*(ITX)^2 \tag{2a}$$

$$PLOSSRX = m*RAIRRX*(IRX)^2 + \alpha*(IRX)^2 + \alpha DC \tag{3a}$$

In equations 2a and 3a, ITX represents transmitter current (e.g., coil current) and IRX represents receiver current (e.g., rectifier output current or, in some embodiments, receiver coil current). The values of RAIRTX and RAIRRX represent measured AC coil resistances for coils 36 and 48 respectively. The values of b, m, a, and $\alpha DC$ are model parameters (sometimes referred to as magnetic power loss coefficients) that characterize the performance of the coupled transmitter and receiver pair in system 8. Transmitter power loss PLOSSTX is solely due to transmitter coil power loss in the model of equation 2a. Receiver power loss PLOSSRX has a first component that is due to receiver coil power losses (the first term of equation 3a) and has a second component (made up of the last two terms in equation 3a) that represents friendly metal losses (e.g., losses due to eddy currents induced in the receiver when power is being transferred). Parameter b may sometimes be referred to as transmitter coil loss parameter or coefficient. Parameter m may sometimes be referred to as a receiver coil loss parameter or coefficient, and parameters $\alpha$ and $\alpha DC$ may sometimes be referred to as friendly metal loss parameters or friendly metal loss coefficients. Parameters b, m, $\alpha$, and $\alpha DC$ depend on the magnetic interactions between device 12 and 24 when coupled and may therefore sometimes be referred to as magnetic loss parameters or magnetic loss coefficients.

In an ecosystem in which there are multiple different models of wireless power transmitting device available to a user (e.g., different models of device 12) and multiple different models of wireless power receiving device available to the user (e.g., different models of device 24), the magnetic loss parameters will vary as a function of which particular transmitter and receiver are paired together. If, as an example, a model I transmitter and model J receiver are paired, the amount of power loss in each device will differ from that experienced when these devices are paired with different devices.

To account for these variations and thereby ensure accurate estimation of foreign object power loss in equation 1, magnetic power loss parameter scaling factors (sometimes referred to as magnetic power loss coefficient scaling factors) are used. In particular, the models of PLOSSTX and PLOSSRX of equations 2a and 2b, which may be inaccurate in ecosystems with multiple different transmitter and receiver models, may be replaced by equations 2b and 3b, respectively.

$$PLOSSTX = gb*bR*RAIRTX*(ITX)^2 \tag{2b}$$

$$PLOSSRX = gm*mR*RAIRRX*(IRX)^2 + ga*\alpha R*(IRX)^2 + g\alpha DC*\alpha RDC \tag{3b}$$

In equation 2b, the transmitter coil loss parameter b is replaced by a reference transmitter coil loss value bR (sometimes referred to as a transmitter coil loss coefficient) that is associated with the transmitter loss measured when a reference transmitter is coupled to a reference receiver and this value is then scaled using the scaling factor gb. In equation 3b, the receiver coil loss parameter m is replaced with mR (sometimes referred to as a receiver coil loss coefficient), which is associated with the receiver coil loss measured when a reference receiver and transmitter are coupled, and this value is then scaled using the scaling factor gm. In equation 3b, the friendly metal loss parameters $\alpha$ and $\alpha DC$ are replaced respectively with reference friendly metal loss parameters (coefficients) $\alpha R$ and $\alpha RDC$ extracted using measurements made with a reference transmitter and reference receiver. The reference friendly metal loss parameters are scaled by respective scaling factors $g\alpha$ and $g\alpha DC$.

By using scaling factors in computing PLOSSTX (see, e.g., equation 2b) and PLOSSRX (see, e.g., equation 3b), equation 1 can be satisfactorily evaluated regardless of which models of transmitter and receiver are paired with each other.

Figure 3:
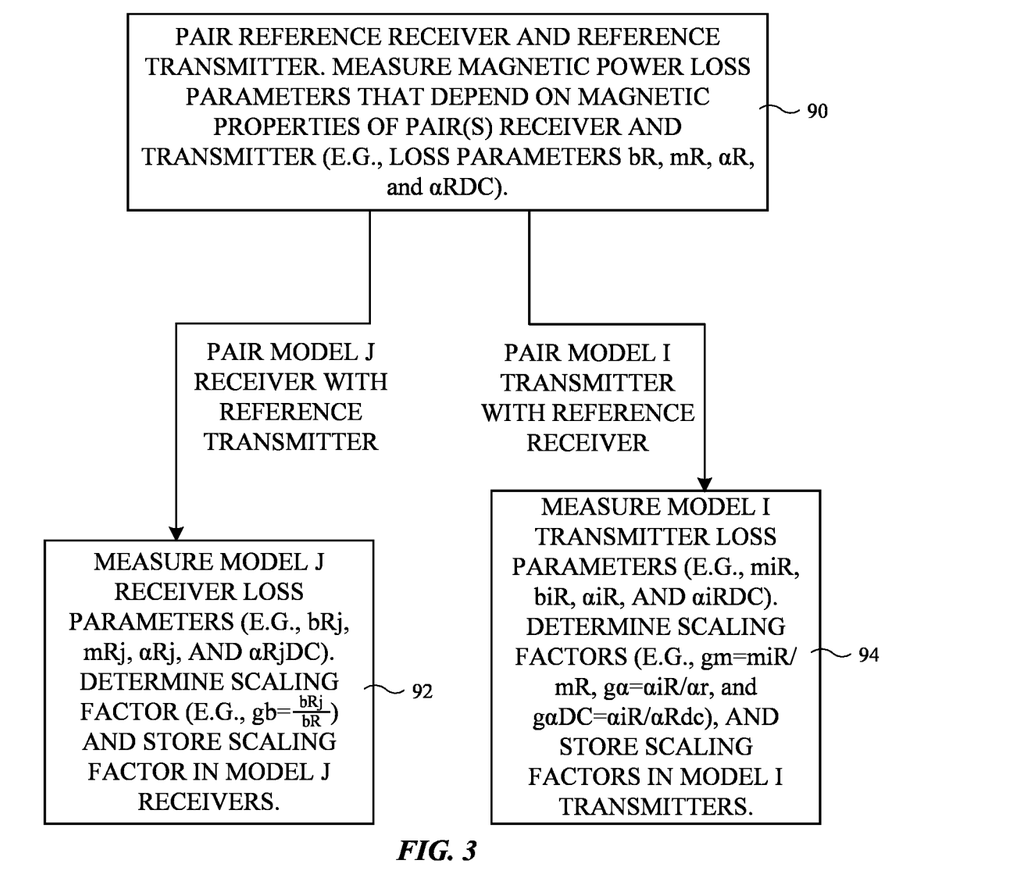
FIG. 3 is a flow chart of illustrative operations associated with using devices in wireless power systems in accordance with embodiments.
Figure 4:
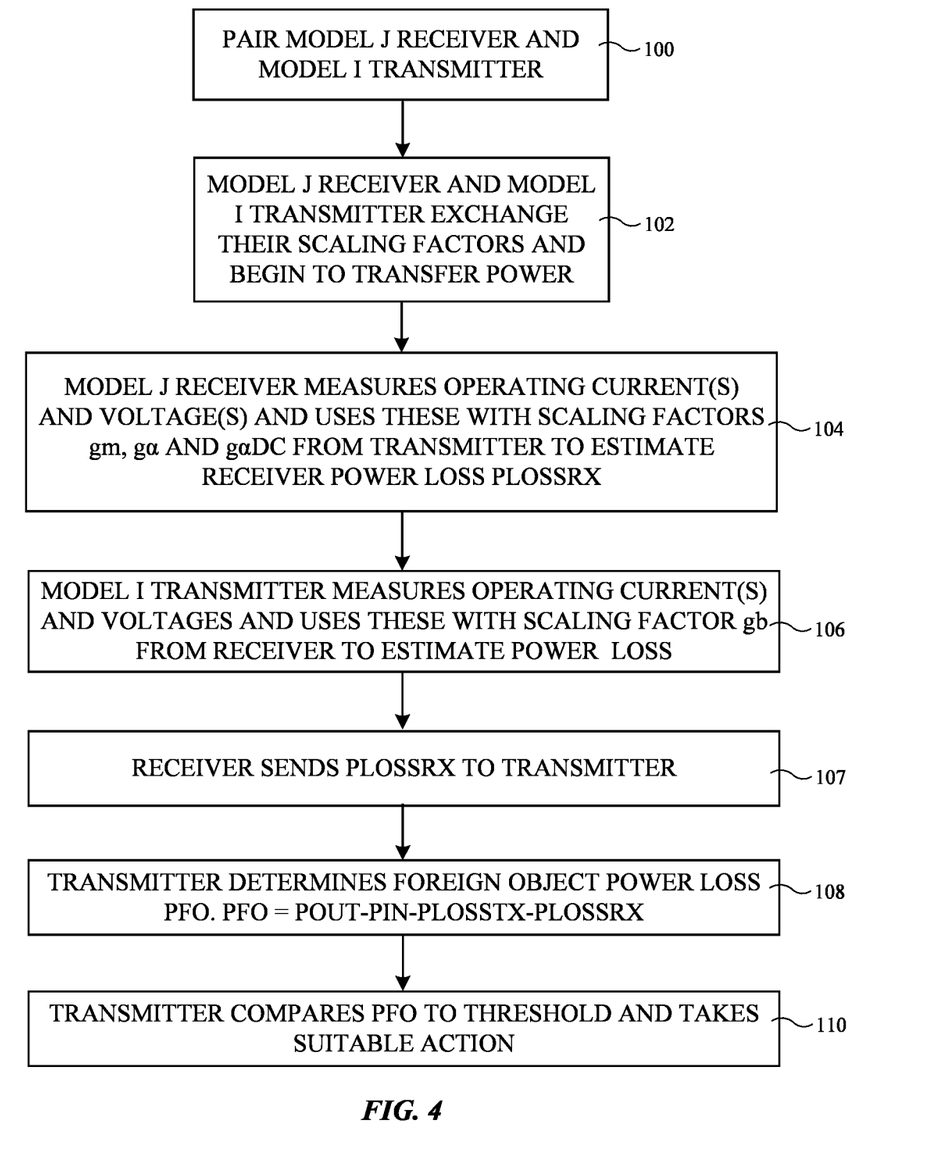
FIG. 4 is a flow chart of illustrative operations associated with using devices in wireless power systems in accordance with embodiments.

Illustrative operations involved in using measuring transmitters and receivers to determine their scaling parameters are shown in the flow chart of FIG. 3. Operations in FIG. 3 are performed at design time and the resulting scaling factors are stored in production units. Illustrative operations involved in using the scaling parameters in system 8 are shown in FIG. 4. Operations in FIG. 4 are performed at runtime (e.g., when transmitter and receiver are paired in preparation for transmitting wireless power between transmitter and receiver). In the examples of FIGS. 3 and 4, it is assumed that the scaling factors for a particular model of transmitter (a model I transmitter) and a particular model of receiver (e.g., a model J receiver) are being obtained using reference device measurements and then subsequently used when a model I transmitter is paired with a model J receiver. In general, this process is expected to be performed for numerous models of transmitter (models other than model I) and for numerous models of receiver (models other than model J). Moreover, any of the various different models of transmitter that have been characterized may, in general, be paired by a user with any of the various different models of receiver that have been characterized. This is because not all users own the same model of transmitter and not all users own the same model of receiver. In the present example, an illustrative user pairs a model I transmitter with a model J receiver during the operations of FIG. 4.

Operations involved in measuring magnetic power loss parameter scaling factors for a model I transmitter and model J receiver are shown in FIG. 3. During the operations of block 90, a reference wireless power receiving device is paired (physically or via a simulated pairing such as a finite element analysis simulation pairing) with a reference wireless power transmitting device. Physical reference devices may be obtained from a centralized source or may be constructed by different device manufacturers in accordance with a universally distributed reference design. Once paired, the reference transmitter and reference receiver may begin transferring power. In particular, during the operations of block 90 the reference transmitter may send wireless power signals to the reference receiver while internal operating parameters (e.g., transmitter and receiver currents and voltages) are measured and stored. From these measurements, the reference magnetic loss parameters are extracted (e.g., the values of reference magnetic loss parameters bR, mR, αR, and αRDC are obtained). In scenarios in which pairing simulations are used in place of measurements on physically paired devices, finite element analysis simulation is used to determine the LQK of the coupled transmitter-receiver pair and then circuit simulations are used to determine the expected currents and voltages. These simulated currents and voltages can then be used to determine the magnetic loss parameters.

After the reference magnetic loss parameters have been determined (either by physical measurements or simulations), a model J receiver is paired with a reference transmitter. While these devices are paired in a simulation or while these devices are physically paired and wireless power is being transferred from the reference transmitter to the model J receiver, loss parameter measurements for the model J receiver may be obtained. In particular, during the operations of block 92, the model J loss parameters (coefficients) bRj, mRj, αRj, and αRjDC are obtained. The "J" in each of these parameters and the R (for "reference") in each of these parameters indicates that the loss parameters are specific to a scenario in which a model J receiver is operating with a reference transmitter. The scaling factor gb (equation 2b) for the model J receiver can then be computed using equation 4 and stored in all model J wireless power receiving devices (e.g., during manufacturing or later using an update).

$$gb = bRj/bR \quad (4)$$

During the operations of block 94, a model I transmitter is paired with a reference receiver. Power is transmitted wirelessly while transmitter operating parameters (e.g., currents and voltages) are measured. From these measurements or simulations, magnetic loss parameters miR, biR, αiR, and αiRDC are obtained for the model I transmitter. Using equations 5, 6, and 7, the scaling factors gm, gα, and gαDC for the model I transmitter are then calculated.

$$gm = miR/mR \quad (5)$$

$$ga = \alpha iR/\alpha R \quad (6)$$

$$g\alpha DC = \alpha iRDC/\alpha RDC \quad (7)$$

The scaling factors for the model I transmitter are then stored in all model I transmitters (e.g., during manufacturing or later using an update).

Illustrative operations involved in using the scaling factors for a model I transmitter and a model J receiver in a scenario in which a model I transmitter and model J receiver are paired by a user are shown in the flow chart of FIG. 4.

During the operations of FIG. 4, a user with a model J receiver and a model I transmitter who wishes to wirelessly transfer power from the model I transmitter to the model J pairs the model I transmitter and model J receiver during the operations of block 100 (e.g., by magnetically attaching a model I charging puck to a model J cellular telephone, as just one example).

During the operations of block 102, the model I transmitter and model J receiver exchange information such as their scaling factors (e.g., using low-power in-band communications or other wireless communications) and being to transfer power. For example, the model J receiver sends the value of scaling factor gm that was obtained from the model J measurements with the reference transmitter at block 92 of FIG. 3 to the model I transmitter. The model I transmitter sends the values of scaling factors gm, gα, and gαDC that were obtained from the model I measurements with the reference receiver at block 94 of FIG. 3 to the model J receiver.

While wirelessly transferring power from the model I transmitter to the model J receiver, measurement circuitry 41 in the transmitter and measurement circuitry 43 in the receiver may measure the operating parameters of the transmitter and receiver (e.g., coil currents and voltages, rectifier output voltage and current, etc.). Current and voltage measurements may, if desired, be exchanged between transmitter and receiver (e.g., using in-band wireless communications).

The information that is measured with circuitry 41 and 43 may be used in conjunction with the exchanged scaling factors to compute PLOSSRX and PLOSSTX using equations 2b and 3b.

During the operations of block 104, for example, the model J receiver may measure rectifier current and rectifier voltage (the product of which is POUT) and may use the measurements in conjunction with the scaling factors gm, gα, and gαDC that were received from the model I transmitter during the operations of block 102 to evaluate equation 3b and thereby estimate PLOSSRX. The scaling factors received from the model I transmitter provide information to receiver J on the expected operating characteristics of the model I transmitter with respect to receiver coil loss and friendly metal loss.

As an example, consider receiver coil loss. If receiver J were to be paired with a reference transmitter, the value of scaling factor gm would be 1.0. The receiver could then use the first term in equation 3b to determine the receiver coil loss (the receiver coil loss being $1.0*mR*RAIRRX*(IRX)^2$), where the values of mR, RAIRRX, and receiver current IRX are known to the receiver. In the present situation, however, receiver J is not paired with a reference transmitter, but is instead paired with transmitter I. Transmitter I might previously have been determined to induce lower coil losses in mated receivers than the reference transmitter so the value of gm that transmitter I passed to the model J receiver during block 102 may be 0.9 (as an example). When the model J receiver evaluates equation 3b using the received scaling factor value of 0.9 from the model I transmitter, the model J receiver will accurately estimate a somewhat reduced value of PLOSSRX (due to the presence of the model I transmitter, which is known to induce lower amounts of receiver coil loss than reference transmitters). As this example demonstrates, by using scaling factors received from the model I transmitter, the magnetic loss parameters that the receiver uses to compute PLOSSRX can be scaled appropriately to reflect that a model I transmitter is present instead of a reference transmitter, thereby enhancing the accuracy with which the value of PLOSSRX is estimated.

During the operations of block 106, the model I transmitter uses measurements of measured transmitter coil current ITX, the known values of bR and RAIRTX, and the scaling factor gb received from the receiver in evaluating equation 2b to estimate PLOSSTX. The scaling factor gb is a reflection of how receivers of model J are expected to affect transmitter coil loss in transmitters that are paired with model J receivers instead of reference receivers. As an example, model J receivers may tend to cause paired transmitters to exhibit more transmitter coil loss than reference receivers. As a result, the value of scaling factor gb that the model I transmitter receives from the model J receiver may be 1.1 (as an example). When evaluating equation 2b, this elevated scaling factor will help the transmitter I account for the fact that the model I transmitter is coupled to a model J receiver and should therefore expect larger transmitter coils losses than if coupled to a reference receiver.

During the operations of block 107, the value of PLOSSRX that is computed at block 104 may be sent to the paired transmitter.

During the operations of block 108, system 8 evaluates the value of PFO using equation 1 (e.g., an estimate is made of foreign object power loss, if any). By accurately estimating PLOSSTX using the scaling factor information received from the model J receiver and by receiving the estimated value of PLOSSRX from the model J receiver, the model I transmitter will have both PLOSSTX and PLOSSRX for equation 1. The value of PIN may be obtained by the transmitter by computing the product of the transmitter coil current (ITX) and voltage from measurement circuitry 41. The value of POUT may be obtained by the transmitter by computing the product of the rectifier output current IRX and rectifier output voltage received from measurement circuitry 43 or receiving POUT from the receiver.

After determining the value of PFO during the operations of block 108, the transmitter may compare PFO to a threshold power loss value (TH). Suitable action may then be taken by system 8. For example, in response to determining that PFO is less than TH, it can be concluded that no foreign object is present and power transfer operations may be allowed to proceed normally (e.g., so that power can be transferred to charge battery 58). In response to determining that PFO is greater than TH, power transfer operations may be restricted. Examples of power transfer restrictions that may be implemented include forgoing all power transfer operations and/or halting power transfer if already in progress, limiting the maximum amount of power that may be transferred (e.g., to a predetermined relatively low power level below the normal maximum power transfer capabilities of system 10), and/or issuing a visual, audible, and/or vibrational alert to a user. If desired alerts for a user (e.g., warnings and/or other informational content informing the user that power transfer operations are not proceeding normally because a foreign object has been detected) may be presented using output devices in device 12 and/or in device 24. For example, control circuitry in device 12 may wirelessly communicate with control circuitry in device 24 to issue a visual alert that is presented on a display in device 24.

It is desirable for power transmitting device 12 and power receiving device 24 to be able to communicate information such as received power and power loss estimates to control wireless power transfer. However, the above-described technology need not involve the transmission of personally identifiable information in order to function. Out of an abundance of caution, it is noted that to the extent that any implementation of this charging technology involves the use of data communication between wireless power transmitters and receivers, the information communicated should be used for controlling power delivery, and implementers should follow privacy policies and practices that are generally recognized as meeting or exceeding industry or governmental requirements for maintaining the privacy of users.

The foregoing is merely illustrative and various modifications can be made to the described embodiments. The foregoing embodiments may be implemented individually or in any combination. In particular, there may be significant flexibility in which receiver loss coefficients and which scaling factors are stored in RX or TX and which are exchanged between TX and RX in runtime. A specific choice of which coefficients and scaling factors to exchange is not a limitation.

What is claimed is:

1. A wireless power transmitting device configured to provide wireless power to a wireless power receiving device, comprising:
    wireless power transmitting circuitry having a wireless power transmitting coil configured to transmit wireless power signals; and
    control circuitry configured to:
        estimate a foreign object power loss value based at least partly on a scaling factor exchanged between wireless power receiving device and wireless power transmitting device, wherein the scaling factor is determined using characterizing information from measurements made with at least one of a reference transmitter or a reference receiver;
    wherein the wireless power receiving device comprises a wireless power receiving device of a given receiver model and wherein the scaling factor is a ratio of: 1) a transmitter coil loss coefficient determined by pairing a receiver of the given receiver model to a reference transmitter to 2) a transmitter coil loss coefficient determined by pairing a reference receiver to a reference transmitter.

2. The wireless power transmitting device defined in claim 1 wherein the control circuitry is further configured to determine whether to present a user interface affordance based at least partly on the estimated foreign object power loss value.

3. The wireless power transmitting device defined in claim 1 wherein the control circuitry is further configured to:
    determine whether a foreign object is present based at least partly on the estimated foreign object power loss value.

4. The wireless power transmitting device of claim 1 wherein control circuitry is configured to wirelessly exchange the scaling factor upon pairing of the wireless power transmitting device with the wireless power receiving device before the wireless power transmitting circuitry commences normal power transfer operations.

5. The wireless power transmitting device of claim 4 wherein the control circuitry is configured to estimate the foreign object power loss value by determining: 1) a power input value, 2) a power output value, 3) a transmitter power loss value; and 4) a receiver power loss value.

6. The wireless power transmitting device of claim 5 wherein the receiver power loss value is determined based at least partly on a receiver coil loss value and a friendly metal loss value.

7. The wireless power transmitting device of claim 5 wherein the control circuitry is configured to obtain the receiver power loss value from the wireless power receiving device.

8. The wireless power transmitting device of claim 1 wherein the wireless power receiving device comprises a wireless power receiving coil and wherein the scaling factor is used to scale a transmitter coil loss coefficient to reflect a dependence of power loss by the wireless power transmitting coil on magnetic coupling between the wireless power transmitting coil and the wireless power receiving coil.

9. A wireless power receiving device configured to obtain wireless power from a wireless power transmitting device, the wireless power receiving device comprising:
wireless power receiving circuitry having a wireless power receiving coil configured to receive wireless power signals; and
control circuitry configured to obtain at least one scaling factor, wherein the at least one scaling factor is determined using characterizing information from measurements made with at least one of a reference transmitter or a reference receiver,
wherein:
the at least one scaling factor comprises a scaling factor received from the wireless power transmitting device, and
the wireless power transmitting device comprises a wireless power transmitting device of a given transmitter model and wherein the scaling factor is a ratio of: 1) a receiver col loss coefficient determined by pairing a transmitter of the given transmitter model to a reference receiver to 2) a receiver coil loss coefficient determined by pairing a refer ce transmitter and a reference receiver.

10. The wireless power receiving device of claim 9 wherein the control circuitry is configured to wirelessly transmit the scaling factor to the wireless power transmitting device using the wireless power receiving coil.

11. The wireless power receiving device of claim 9 wherein the control circuitry is configured to determine a receiver power loss value using the scaling factor.

12. The wireless power receiving device of claim 11 wherein the scaling factor comprises a scaling factor received from the wireless power transmitting device using the wireless power receiving coil.

13. A wireless power receiving device configured to obtain wireless power from a wireless power transmitting device, the wireless power receiving device comprising:
wireless power receiving circuitry having a wireless power receiving coil configured to receive wireless power signals; and
control circuitry configured to obtain at least one scaling factor, wherein the at least one scaling factor is determined using characterizing information from measurements made with at least one of a reference transmitter or a reference receiver,
wherein:
the at least one scaling factor comprises a scaling factor received from the wireless power transmitting device, and
the wireless power transmitting device comprises a wireless power transmitting device of a given transmitter model and wherein the scaling factor is a ratio of: 1) a friendly metal loss coefficient determined by pairing a transmitter of the given transmitter model to a reference receiver to 2) a friendly metal loss coefficient determined by pairing a reference transmitter and a reference receiver.

14. The wireless power receiving device of claim 13 wherein the control circuitry is configured to wirelessly transmit the scaling factor to the wireless power transmitting device using the wireless power receiving coil.

15. The wireless power receiving device of claim 13 wherein the control circuitry is configured to determine a receiver power loss value using the scaling factor.

16. The wireless power receiving device of claim 15 wherein the scaling factor comprises a scaling factor received from the wireless power transmitting device using the wireless power receiving coil.

* * * * *

UNITED STATES PATENT AND TRADEMARK OFFICE
CERTIFICATE OF CORRECTION

| | | |
|---|---|---|
| PATENT NO. | : 12,395,017 B2 | Page 1 of 1 |
| APPLICATION NO. | : 17/681363 | |
| DATED | : August 19, 2025 | |
| INVENTOR(S) | : Adam L. Schwartz et al. | |

It is certified that error appears in the above-identified patent and that said Letters Patent is hereby corrected as shown below:

In the Claims

Column 13, Claim 9, Line 24, please replace the word "col" with --coil--.

Column 13, Claim 9, Line 27, please replace the phrase "refer ce" with the word --reference--.

Signed and Sealed this
Second Day of December, 2025

John A. Squires
*Director of the United States Patent and Trademark Office*